US011574274B2

(12) United States Patent
Noivo et al.

(10) Patent No.: US 11,574,274 B2
(45) Date of Patent: Feb. 7, 2023

(54) SYSTEM AND METHOD FOR EVALUATING APPLICATION ERRORS IN E-COMMERCE APPLICATIONS

(71) Applicant: NOIBU TECHNOLOGIES INC., Ottawa (CA)

(72) Inventors: Kailin Noivo, Ottawa (CA); Robert Boukine, Gatineau (CA); Filip Slatinac, Gatineau (CA); Dan Cardamore, Kanata (CA)

(73) Assignee: NOIBU TECHNOLOGIES INC., Ottawa (CA)

( * ) Notice: Subject to any disclaimer, the term of this patent is extended or adjusted under 35 U.S.C. 154(b) by 0 days.

(21) Appl. No.: 17/091,989

(22) Filed: Nov. 6, 2020

(65) Prior Publication Data

US 2021/0142258 A1    May 13, 2021

Related U.S. Application Data

(60) Provisional application No. 62/932,100, filed on Nov. 7, 2019.

(51) Int. Cl.
*G06Q 10/06* (2012.01)
*G06Q 10/10* (2012.01)
(Continued)

(52) U.S. Cl.
CPC ............ *G06Q 10/06395* (2013.01); *G06F 11/3608* (2013.01); *G06F 11/3664* (2013.01); *G06Q 10/20* (2013.01); *G06Q 30/0201* (2013.01); *G06Q 10/103* (2013.01); *G06Q 30/0633* (2013.01); *G06Q 30/0641* (2013.01)

(58) Field of Classification Search
CPC ............ G06Q 10/06395; G06Q 10/20; G06Q 30/0201; G06Q 10/103; G06Q 30/0633; G06Q 30/0641; G06F 11/3608; G06F 11/3664
See application file for complete search history.

(56) References Cited

U.S. PATENT DOCUMENTS 6,718,486 B1 * 4/2004 Roselli ................ G06F 11/1438
714/41
7,904,833 B2 * 3/2011 Cheng ................. G06Q 20/401
715/713

(Continued)

FOREIGN PATENT DOCUMENTS

DE     102013000661 A1 *  7/2014  ....... G06F 17/30864

OTHER PUBLICATIONS

Javadi, Mohammad Hossein Moshref, et al. "An analysis of factors affecting on online shopping behavior of consumers." International journal of marketing studies 4.5 (2012): 81. (Year: 2012).*

(Continued)

*Primary Examiner* — Sujay Koneru
(74) *Attorney, Agent, or Firm* — Sheppard, Mullin, Richter & Hampton LLP

(57) ABSTRACT

Systems and methods for tracking and ranking errors in computer systems may be used in e-commerce applications in order to identify errors that occur in e-commerce user sessions along with an estimate of potential lost revenues resulting from the error. The errors and associated lost revenues may allow prioritizing of which errors to address.

19 Claims, 11 Drawing Sheets

(51) Int. Cl.
*G06Q 10/00* (2012.01)
*G06Q 30/02* (2012.01)
*G06Q 30/06* (2012.01)
*G06F 11/36* (2006.01)

(56) References Cited

U.S. PATENT DOCUMENTS

| | | | | |
|---|---|---|---|---|
| 8,756,118 B1* | 6/2014 | Bernshteyn | | G06Q 30/06 |
| | | | | 705/26.1 |
| 10,339,585 B2* | 7/2019 | Abhishek | | G06Q 30/0627 |
| 2002/0103663 A1* | 8/2002 | Bankier | | G06Q 20/00 |
| | | | | 709/224 |
| 2004/0123213 A1* | 6/2004 | Welbon | | H03M 13/35 |
| | | | | 714/704 |
| 2006/0095956 A1* | 5/2006 | Ashley | | H04L 67/30 |
| | | | | 726/4 |
| 2006/0293935 A1* | 12/2006 | Tsyganskiy | | G06F 8/34 |
| | | | | 714/48 |
| 2013/0110590 A1* | 5/2013 | Folk | | G06Q 10/06 |
| | | | | 705/7.42 |
| 2013/0238940 A1* | 9/2013 | Chalmers | | G06F 11/3688 |
| | | | | 714/E11.178 |
| 2017/0318083 A1* | 11/2017 | Ignatyev | | H04L 43/0876 |
| 2019/0034254 A1* | 1/2019 | Nataraj | | G06F 11/0709 |
| 2019/0163610 A1* | 5/2019 | Vent | | G06F 11/079 |
| 2019/0260818 A1* | 8/2019 | Ciabarra, Jr. | | G06F 11/0751 |
| 2021/0142258 A1* | 5/2021 | Noivo | | G06F 11/3608 |

OTHER PUBLICATIONS

"Ecommerce Manager Guide: Preventing Errors on Your Ecommerce Website" by NOIBUE (https://noibu.com/ecommerce-manager-guide-preventing-errors-on-your-ecommerce-website/) (Year: 2019).*

* cited by examiner

Site Errors https://errortracking.example.com/error7754 demo.acme.com
Error 7754 Statistics

| | On Site 1002 | | Added to Cart 1004 | | Checkout Started 1006 | | Placed Order 1008 | |
|---|---|---|---|---|---|---|---|---|
| | Site Average | This Error | Site Average | This Error | Site Average | This Error | Site Average | This Error |
| Leads (Users) 1010 | 3625036 | 3625036 | 212763 | 212763 | 127938 | 127938 | 84123 | 84123 |
| Progressed 1012 | 247358 | 247358 | 114057 | 114057 | 74970 | 74970 | 77905 | 54932 |
| Progressed % 1014 | 6.8% | 6.8% | 53.6% | 53.6% | 58.6% | 58.6% | 92.6% | 65.3% |
| Leads Lost 1016 | - | 0 | - | 0 | - | 0 | - | 29191 |
| Transactions Lost 1018 | - | 0 | - | 0 | - | 0 | - | 29191 |
| Annualized Revenue Lost 1020 | - | 0 | - | 0 | - | 0 | - | $1,459,550 |

FIG. 10

Site Errors

← → ↻ ⌂  https://errortracking.example.com/errors demo.acme.com
Issues with most revenue loss (Last 90 days)

| 1102 ID | 1104 First/Last Seen | 1106 Unique error ID | 1108 Annualized Revenue Loss | 1110 Fix Difficulty |
|---|---|---|---|---|
| 8190 | Feb. 7 – Oct. 27 | 400-demo.acme.com/api/storefront/checkouts/*/* | $268,680 | Difficult |
| 8167 | Oct. 5 – Oct. 27 | 400-demo.acme.com/api/storefront/checkouts/*/coupons | $215,395 | Medium |
| 5319 | Feb. 7 – Oct. 27 | sentry~checkout-*.js:null is not an object (*) | $152,254 | Unknown |
| 7762 | Sept. 1 – Oct. 27 | 429-sentry.io/api/*/store | $78,991 | Easy |

SYSTEM AND METHOD FOR EVALUATING APPLICATION ERRORS IN E-COMMERCE APPLICATIONS

RELATED APPLICATIONS

The current application claims priority to U.S. Provisional Application 62/932,100 filed Nov. 7, 2019, entitled "SYSTEM AND METHOD FOR TRACKING AND RANKING COMPUTER SYSTEM ERRORS," the entire contents of which are incorporated herein by reference in their entirety for all purposes.

TECHNICAL FIELD

The present disclosure relates to error evaluation. More specifically, the present disclosure relates to evaluating errors in an e-commerce application.

BACKGROUND

Many, if not most, computer systems produce errors from time to time. These errors may result from users interacting with the computer system in unexpected ways, or they may be internal to the computer system itself. Additionally, some errors may result from other external causes, such as network changes or a computer virus.

Errors can be extremely frustrating to a user and may prevent them from achieving their goals. For instance, an e-commerce application, which may include a website, may have an error that prevents the user from performing a successful "check out", thus preventing that user from making a purchase and resulting in lost revenue for the website owner. Additionally, some errors can be so significant that they prevent a user from returning to the computer system: in the same e-commerce example, repeated problems when checking out may dissuade a user from ever attempting to use that website again. As another example, if a database system consistently returns inaccurate information, users are unlikely to continue relying on that product. Similarly, video and computer games might have errors that prevent the user from saving or opening game files, which will often discourage them from attempting to play in future. Additionally, such errors may lead the user to leave a negative review of the computer system on online forums, or otherwise warn their contacts away from the system, thus leading to further lost revenue. Accordingly, developers and computer system owners have a significant interest in correcting errors and in mitigating the effects of errors.

In some cases, it can be useful to look through output logs from the computer system 304 to determine what errors have been reported. However, this approach is extremely time-consuming, as the sheer volume of data is challenging to parse. As well, errors reported in logs are often presented with very little, if any, context. Additionally, not all errors that occur during the use of a computer system are critical to the computer system or otherwise prevent the user from reaching their goals. In particular, many back-end errors may be ultimately irrelevant to the user, but are nevertheless reported as errors in the logs. As another example, many interface errors do not actually prevent the user from successful use of the computer system, although the user may notice them. (For instance, an icon on a website may be oddly distorted.) Such functionally irrelevant errors may not be worth a developer's time to correct/mitigate, especially if the system also has more significant errors. Clearly, it can be difficult to assign priority to specific errors based on the output logs, potentially leading developers to spend time on less-critical fixes.

Further, most errors that occur "in the wild" (i.e., after testing) are typically reported to developers by the users who encounter them. Although this may mean that only critical or severe errors are reported (as most users will not report errors that did not affect their experience with the computer system), in other cases, users may be too frustrated with a computer system to spend their time filing a complaint. Thus, user-reported errors do not always reflect even the most significant errors that occur. Additionally, user reports about errors are not always clear or useful: an as example, a user might submit an error report that simply says "It didn't work." Following up for more information, even if successful, can take a great deal of time and effort on the part of the developer(s) and/or other administrative user(s).

Moreover, it is often very difficult for the user to recall precisely what they were doing when the error occurred. This is especially relevant when the error is related to unusual user input, such as an unusual sequence of clicks or keystrokes. This makes it difficult to replicate the error and may lead developers and administrators to direct their attention to other tasks. User reporting of errors thus has several drawbacks. In particular, the error reports may not address every error, or even every serious error, and the causes of the errors may be difficult to identify or replicate, making the errors difficult to understand, mitigate, or correct.

As such, there is clearly a need for a system that can track errors in computer systems and that can prioritize those errors in terms of their effect on the user. Such a system can assist the developers, owners, and/or administrative users of the computer systems in developing a schedule or determining other actions to correct the errors and/or mitigate any effects of those errors. Additionally, there is a need for systems that can preserve error context so that errors can be corrected or mitigated more efficiently.

BRIEF DESCRIPTION OF THE DRAWINGS

The present disclosure will now be described by reference to the following figures, in which identical reference numerals refer to identical elements and in which:

FIG. 10 depicts a further user interface for use in evaluating errors in an e-commerce application; and FIG. 11 depicts a further user interface for use in evaluating errors in an e-commerce application.

DETAILED DESCRIPTION

Figure 1:
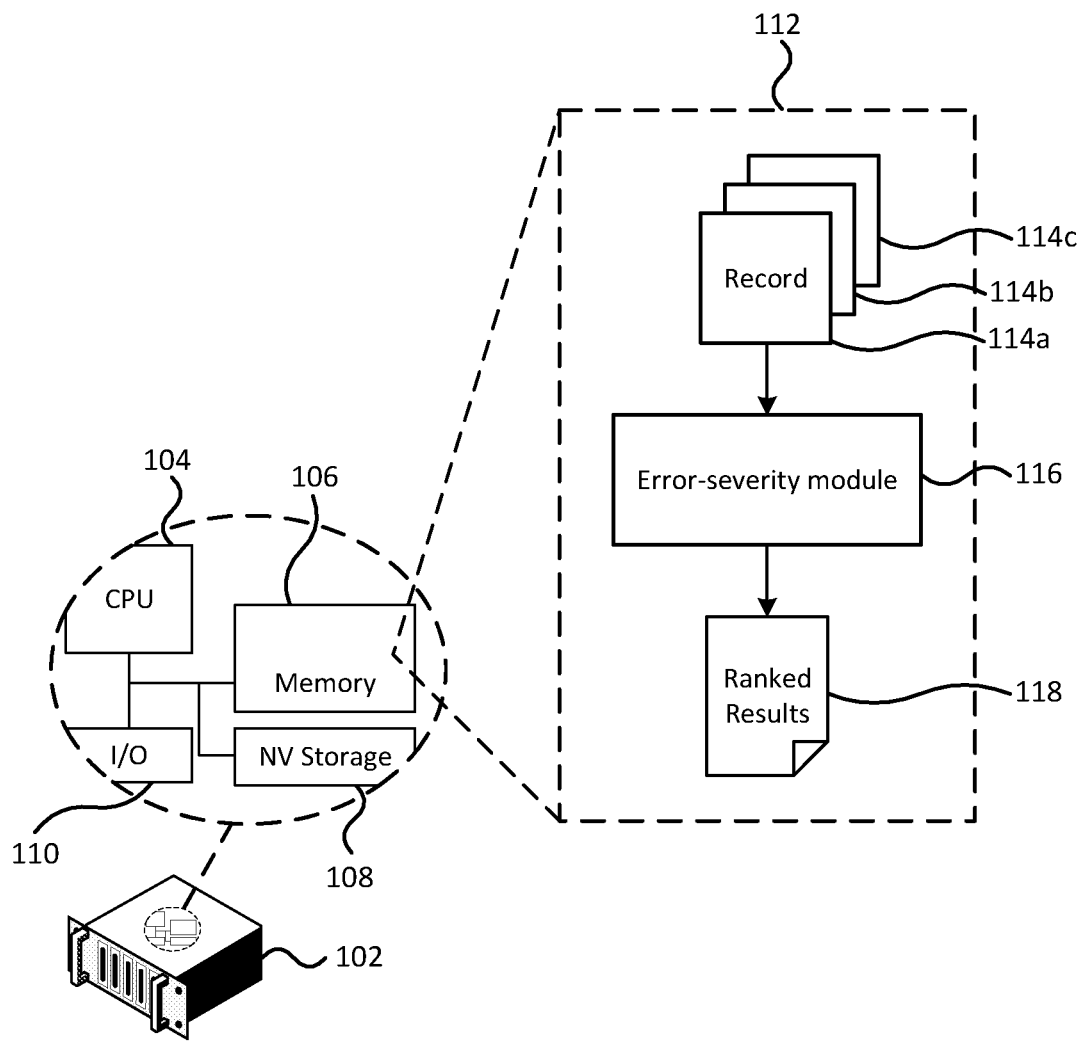
FIG. 1 is a block diagram illustrating a system according to one aspect of the disclosure.

The present disclosure provides a system and method for ranking errors in a computer system. A record of each error that occurs during use of the computer system is passed to an error-severity module. The error-severity module then determines a level of severity for each error, based on multiple criteria, including the associated record and other factors (other factors may include, for instance, the number of times a single error occurs). In one embodiment, a higher level of severity may correspond to a more severe effect or more significant effect on the actions of the user. (For instance, ending the session prematurely is generally a significant/severe effect.) The error-severity module then ranks these errors. In one embodiment, the ranking is based on the level of severity of each error. The results of that ranking may then be used to determine a schedule or a priority for correction and/or mitigation of the effects of the errors.

The present disclosure provides a system and method for tracking and ranking errors in computer systems in relation to e-commerce applications. A record of each error that occurs during use of a computer system is passed to an error-severity module. The record is based on information from the computer system. Based on these records, the error-severity module determines a level of severity of each error. The levels of severity correspond to effects of the errors on actions of the user of the computer system. The error-severity module then ranks the errors. The results of the ranking may then be used in determining priorities for error correction/mitigation. Further, the system may identify and predict errors that occur on more than one system. In some embodiments, the system records all interactions of a user with the computer system, and may generate human-viewable reconstruction(s) and/or human-readable summaries of those interactions. In some implementations, the error-severity module uses machine learning.

In accordance with the present disclosure there is provided a method for evaluating e-commerce application errors comprising: collecting error information of application errors experienced by users of an e-commerce application; for each of the errors, determining error funnel statistics for users experiencing the respective error, the error funnel statistics providing an indication of a number of users progressing to each next stage in a multi-stage commerce progress funnel of the e-commerce application; generating a user interface providing indications of one or more of the errors and a respective estimated revenue loss resulting from each of the respective errors, the estimated revenue lost determined based on an average purchase amount for the e-commerce application and a difference between error funnel statistics for the error and average funnel progression statistics of users of the e-commerce application; and transmitting the generated user interface to a remote computer.

In a further embodiment of the method, collecting error information comprises: receiving and storing session information from a plurality of users, the e-commerce session information of each of the plurality of users associated with the respective user's interaction with the e-commerce application and comprising error indications of one or more application errors resulting from the user's interaction with the e-commerce application, each of the one or more application errors identified by a unique error identifier.

In a further embodiment of the method, the session information further comprises: interaction indications of one or more application interactions of the e-commerce application with at least one server.

In a further embodiment of the method, the method further comprises: processing session information to determine the average funnel progression statistics and the error funnel progression statistics.

In a further embodiment of the method, the method further comprises: processing session information to determine the average purchase amount.

In a further embodiment of the method, the indications of one or more of the errors presented in the generated user interface are presented in a ranked order.

In a further embodiment of the method, the indications of the one or more of the errors are ranked based on one or more of: the estimated revenue lost resulting from the respective error; and an estimated time to fix the respective error.

In a further embodiment of the method, the multi-stage commerce progress funnel comprises: an 'on site' stage indicating that a user is using the e-commerce application; an 'added to cart' stage indicating that a user has added an item to a shopping cart for purchase; a 'checkout started' stage indicating that a user has begun checking out; and a 'place order' stage indicating that a user has placed an order.

In a further embodiment of the method, each of the errors is associated with an issue identifier and a unique error including a portion indicative of the e-commerce application, wherein the issue identifier can identify common issues across different e-commerce applications.

In a further embodiment of the method, the error information is collected from a user's device from a data collection script embedded in the e-commerce application.

In a further embodiment of the method, the method further comprises: receiving a request for the data collection script from a computing device; and transmitting the requested data collection script to the computing device.

In a further embodiment of the method, the error information is further collected from one or more servers associated with the e-commerce application.

In a further embodiment of the method, the error information collected from one or more servers is associated with a unique session ID usable to aggregate the error information associated with the same session.

In a further embodiment of the method, the session information includes information for recreating a user's view of the session.

In accordance with the present disclosure there is provided a non-transitory computer readable memory storing instructions, which when executed by a processor of a system configure the system to perform a method comprising: collecting error information of e-commerce application errors experienced by users of an e-commerce application; for each of the errors, determining error funnel statistics for users experiencing the respective error, the error funnel statistics providing an indication of a number of users progressing to each next stage in a multi-stage commerce progress funnel of the e-commerce application; generating a user interface providing indications of one or more of the errors and a respective estimated revenue loss resulting from each of the respective errors, the estimated revenue lost determined based on an average purchase amount for the e-commerce application and a difference between error funnel statistics for the error and average funnel progression statistics of users of the e-commerce application; and transmitting the generated user interface to a remote computer.

In a further embodiment of the non-transitory computer readable memory, collecting error information comprises: receiving and storing session information from a plurality of users, the session information of each of the plurality of users associated with the respective user's interaction with the e-commerce application and comprising error indications of one or more application errors resulting from the user's interaction with the e-commerce application, each of the one or more application errors identified by a unique error identifier.

In a further embodiment of the non-transitory computer readable memory, the session information further comprises: interaction indications of one or more application interactions of the e-commerce application with at least one server.

In a further embodiment of the non-transitory computer readable memory, the method performed by executing the stored instructions further comprises: processing session information to determine the average funnel progression statistics and the error funnel progression statistics.

In a further embodiment of the non-transitory computer readable memory, the method performed by executing the stored instructions further comprises: processing session information to determine the average purchase amount.

In a further embodiment of the non-transitory computer readable memory, the indications of one or more of the errors presented in the generated user interface are presented in a ranked order.

In a further embodiment of the non-transitory computer readable memory, the indications of the one or more of the errors are ranked based on one or more of: the estimated revenue lost resulting from the respective error; and an estimated time to fix the respective error.

In a further embodiment of the non-transitory computer readable memory, the multi-stage commerce progress funnel comprises: an 'on site' stage indicating that a user is using the e-commerce application; an 'added to cart' stage indicating that a user has added an item to a shopping cart for purchase; a 'checkout started' stage indicating that a user has begun checking out; and a 'place order' stage indicating that a user has placed an order.

In a further embodiment of the non-transitory computer readable memory, each of the errors is associated with an issue identifier and a unique error including a portion indicative of the e-commerce application, wherein the issue identifier can identify common issues across different e-commerce applications.

In a further embodiment of the non-transitory computer readable memory, the error information is collected from a user's device from a data collection script embedded in the e-commerce application.

In a further embodiment of the non-transitory computer readable memory, the method performed by executing the stored instructions further comprises: receiving a request for the data collection script from a computing device; and transmitting the requested data collection script to the computing device.

In a further embodiment of the non-transitory computer readable memory, the error information is further collected from one or more servers associated with the e-commerce application.

In a further embodiment of the non-transitory computer readable memory, the error information collected from one or more servers is associated with a unique session ID usable to aggregate the error information associated with the same session.

In a further embodiment of the non-transitory computer readable memory, the session information includes information for recreating a user's view of the session.

In accordance with the present disclosure there is provided a system for evaluating application errors, the system comprising: a processor for executing instructions; and a memory storing instructions, which when executed by the processor configure the system to perform a method comprising: collecting error information of application errors experienced by users of an e-commerce application; for each of the errors, determining error funnel statistics for users experiencing the respective error, the error funnel statistics providing an indication of a number of users progressing to each next stage in a multi-stage commerce progress funnel of the e-commerce application; generating a user interface providing indications of one or more of the errors and a respective estimated revenue loss resulting from each of the respective errors, the estimated revenue lost determined based on an average purchase amount for the e-commerce application and a difference between error funnel statistics for the error and average funnel progression statistics of users of the e-commerce application; and transmitting the generated user interface to a remote computer.

In a further embodiment of the system, collecting error information comprises: receiving and storing session information from a plurality of users, the session information of each of the plurality of users associated with the respective user's interaction with the e-commerce application and comprising error indications of one or more application errors resulting from the user's interaction with the e-commerce application, each of the one or more application errors identified by a unique error identifier.

In a further embodiment of the system, the session information further comprises: interaction indications of one or more application interactions of the e-commerce application with at least one server.

In a further embodiment of the system, the method performed by executing the stored instructions further comprises: processing session information to determine the average funnel progression statistics and the error funnel progression statistics.

In a further embodiment of the system, the method performed by executing the stored instructions further comprises: processing session information to determine the average purchase amount.

In a further embodiment of the system, the indications of one or more of the errors presented in the generated user interface are presented in a ranked order.

In a further embodiment of the system, the indications of the one or more of the errors are ranked based on one or more of: the estimated revenue lost resulting from the respective error; and an estimated time to fix the respective error.

In a further embodiment of the system, the multi-stage commerce progress funnel comprises: an con site" stage indicating that a user is using the e-commerce application; an 'added to cart' stage indicating that a user has added an item to a shopping cart for purchase; a 'checkout started' stage indicating that a user has begun checking out; and a 'place order' stage indicating that a user has placed an order.

In a further embodiment of the system, each of the errors is associated with an issue identifier and a unique error including a portion indicative of the e-commerce application, wherein the issue identifier can identify common issues across different e-commerce applications.

In a further embodiment of the system, the error information is collected from a user's device from a data collection script embedded in the e-commerce application.

In a further embodiment of the system, the method performed by executing the stored instructions further comprises: receiving a request for the data collection script from a computing device; and transmitting the requested data collection script to the computing device.

In a further embodiment of the system, the error information is further collected from one or more servers associated with the e-commerce application.

In a further embodiment of the system, the error information collected from one or more servers is associated with a unique session ID usable to aggregate the error information associated with the same session.

In a further embodiment of the system, the session information includes information for recreating a user's view of the session.

Errors may affect the actions of users in many ways. For instance, as a result of an error, the user may simply cease interacting with the computer system. The user may also refuse or be unable to use the computer system as they intended (e.g., they may be prevented from making a purchase). They may also make a complaint to administrative users. (These should, of course, be understood as merely some examples of possible effects, and not as an exhaustive list.) As would be evident, some effects may be more significant/severe than others. Also, as would be clear, a single error may have more than one effect. For instance, if a user is unable to make a purchase, they may quit (i.e., cease interacting with the computer system). Further, as discussed above, some errors may have no discernable effect on a user's actions and may thus be relatively non-severe. It should be noted, however, that different users may respond differently to different errors. Thus, it may be preferable to gather data related to many users' actions in response to a certain error.

Note that the term 'error' as used herein should be interpreted broadly. 'Errors' include, but are not limited to, 'bugs', 'glitches', flaws in code, problems resulting from unexpected user input, logic errors, display errors, interface errors, status and/or network communication errors, and/or anything else that results in less-than-optimal performance of the computer system. Additionally, the term 'error' may include errors that prevent users from accessing the computer system at all. Similarly, the term 'computer system' should be interpreted broadly, as including without limitation websites, games, computer programs, downloaded software, on-line or cloud-based software, distributed systems, and hardware on which the software may be run. In some embodiments, the system of the present disclosure may not distinguish between hardware and software errors, while in other embodiments, such distinctions may be made. For additional clarity, a single exemplary computer system may comprise: hardware devices that run and/or access a software application, that software application itself, and the content accessed by that software application.

FIG. 1 is a block diagram illustrating an embodiment of the system 102. The system 102 is depicted as a server, however the functionality described herein can be implemented on one or more servers or computer systems. The system 102 comprises at least one processing unit 104 for executing instructions. A memory unit 106 stores data and instructions that are executed by the processing unit 104. The memory unit 106 may provide volatile short term storage, however the system 102 may also include non-volatile storage 108 for additional storage. The system may include one or more input/output (I/O) interfaces 110 for connecting one or more additional components to the system 102. The instructions stored in the memory 106 can be executed by the processor 104 to provide various components 112 as described further below.

Error records 114a, 114b, and 114c, each corresponding to an error that occurs during the use of a computer system, are passed to the error-severity module 116. The error-severity module 116 then determines a level of severity for each error corresponding to one of the records 114a-114c, and ranks the errors based on their levels of severity. The results of the ranking 118 can then be used to create determine priorities for correction/mitigation.

As an example, consider an e-commerce website, and assume the following: the error corresponding to record 114a was a minor distortion in a presented image; the error corresponding to record 114b was an error that prevented the user from entering log-in information and thus prevented them from logging in to their account; and the error corresponding to record 114c was the failure of a promotional video to play. In a likely implementation, the error-severity module 116 would assign a high level of severity to the error corresponding to record 114b, while the error corresponding to record 114c would be assigned a lower level of severity, and the error corresponding to record 114a would be assigned a still lower level of severity. The error-severity module 116 would then rank the records. The ranking may be in part related to the level of severity but may also consider other factors. The ranking process produces the ranking results 118.

The records 114 of the errors are based at least partially on information generated by the computer system (which again may include both software and hardware elements). That information may comprise timestamps, error logs and error numbers, information relating to the at least one user's actions, specific computer system configuration information, and any other relevant information. In particular, in some embodiments, information about the effect(s) and/or potential effect(s) of the error may be contained in the error record, and/or may be taken from other sources, including from historical data. Additionally, in some embodiments, information related to the errors may be gathered from third-party systems, databases, or similar.

Note that not all hardware errors may be detectable by the disclosure. For instance, if the hardware suffers extreme damage and signals can no longer be sent to the system 102, the system 102 would not be able to determine the specific cause of such an error. However, many other hardware errors may be detected, tracked, and ranked by the present disclosure. Additionally, in many cases, hardware errors can be identified as hardware errors by ruling out software errors.

In some embodiments of the disclosure, the records 114 are generated externally and passed to the system 102. For instance, the records 114 may be generated by the at least one device used to run the computer system and passed to the system 102. As an alternative, the information from the at least one device may be passed to an external system or module that is used to generate records and to store those records until they are passed to the system 102. In other embodiments of the disclosure, the system 102 may comprise an internal error-generation module that receives the information directly from the computer system and processes the information to thereby generate the records 114.

It should be clear that the use of three records in this Figure and example is merely exemplary. The use of a computer system for a single session where a session is a period of time beginning when a user begins to interact with that computer system and ending when the user ceases interacting with that computer system may result in any number of errors, from zero to dozens, hundreds, or more. The absolute number of errors may depend on many factors, including among others the length of the session, the quality of the computer system, any user input, and characteristics of the user's device(s). Further, of course, it should be understood that, depending only on the limits of the computer system itself, multiple users may access the same computer system simultaneously.

The level of severity may be represented by a field on the error record that is filled by the error-severity module 116, or by a flag attached to the record by the error-severity module 116, or by any other suitable indicator. Additionally, as would be understood by the person skilled in the art, the different levels of severity may be organized in any hierarchical way that is able to convey differences in relative importance. For instance, in one implementation, there may be five levels of severity, progressing from 'Level 1', representing the least critical/least severe errors, to 'Level 5', representing the most critical/most severe errors. In an alternative implementation, errors designated 'Level 1' could be the most severe errors, and larger numbers could indicate less severe errors. Moreover, there may be any suitable number of severity levels: that is, simple systems may need only a few levels to allow efficient ranking and scheduling, while more complex systems and/or systems with many errors may benefit from having a larger number of potential severity classes.

Additionally, the level of severity does not have to be represented by a single number, or by any numerical value at all. That is, the level of severity may be represented by any kind of indicator, including by text (e.g., classifications such as "most severe", "severe", "least severe") and/or by vector or tensor values. The person skilled in the art would understand that one implementation of severity levels may be more suited to a particular computer system than another implementation.

Further, the error-severity module 116 may be a rules-based module. In such an embodiment, the rules for determining the level of severity of any error may be set in advance by an administrative user. In some embodiments, such a module could also be user-configurable, so that an administrative user could alter the rules from time to time, to better align with current administrative priorities. For instance, at one point in time, check-out errors may be considered most severe by the administrative user. However, at a later point in time, item display errors may be considered more severe than check-out errors, and the administrative user may change the severity rules accordingly. Note though that the level of severity is still at least partially based on an effect on the actions of the user.

Note that an administrative user may, depending on the implementation of the disclosure, include any user who oversees the computer system, such as a developer, designer, or owner of the computer system, or an administrator, developer, or designer of the system 102 itself, or any combination thereof. As should be clear, more or less restrictive administrative permissions may be preferable in different implementations of the disclosure. Note also that, in some implementations, the 'administrative user' may comprise a machine or programmed element that determines priorities based on the ranking results 118 with little or no human oversight, and/or makes other decision related to error correction/mitigation. Further, in some implementations, machine or programmed elements may recommend priorities to a human administrative user, who would accept or reject the recommendation(s).

In one implementation of a system 102 using a rules-based error-severity module 116, the error-severity module 116 may keep a tally of errors of the same type that do not result in the user abandoning their session. That is, if a user continues using the system after an error occurs, a tally or counter variable for that error may be incremented. If the tally reaches a certain value, or represents a certain percentage of the total users of that specific computer system, the error-severity module 116 may determine that the error is not especially severe, and assign that error a correspondingly low level of severity. Of course, it should be understood that numerous such tally/counter rules could be designed: as another example, an error tally could be incremented whenever that error does lead a user to end their session (i.e., a significant effect on the user's actions). High tallies in that case would suggest a high level of severity for the error in question. Many other such mechanisms and rules may be devised, all of which are intended to fall within the scope of the present disclosure.

However, depending on the number of computer systems analyzed by the system 102 and the number of users of each, it may be difficult if not impossible to predict every possible error so that appropriate rules may be designed, even when the rules may be changed on an on-going basis as described above. Thus, in some implementations, the error-severity module 116 comprises a machine-learning-based module. Such a module could be trained to determine levels of severity using exemplary, purpose-built training data, real-world error records, and/or a combination thereof. Additionally, the system 102 may collect feedback from users and/or administrative users of the computer systems and use that data to continue 'learning' once trained.

Once the level of severity is determined, the error-severity module 116 ranks the errors from most critical/severe to least critical/severe. In embodiments using a numerical scale to represent the level of severity, this ranking process may be simply a matter of arranging the error records in numerical order (for instance, grouping all 'Level 1' records together, grouping all 'Level 2' records together, and so on). However, where more complex severity-level metrics are used, the ranking process may be likewise more complex.

Further, the ranking process may also account for factors other than the level of severity, including without limitation the length of time required for correction/mitigation of each error or the rise in goodwill associated with correcting/mitigating each error. Depending on the computer system 304 and the circumstances of use, there may be value in correcting 'less critical' errors first, especially if none of the errors reported during a session entirely prevent the user from accomplishing their goal(s). For instance, if the user interface of the computer system has minor aesthetic flaws that could be easily corrected, and also has more severe interface problems that will take longer to correct but do not substantially interfere with use of the system, there may be value in fixing the small errors first. Thus, in some embodiments, the error-severity module 116 may take such factors into account.

Further, the error-severity module 116 may consider such factors as potential/probable losses in revenue due to an error or errors when assigning the levels of severity. For instance, if an error is likely to result in a large revenue loss, the level of severity assigned to the error could be correspondingly high. On the other hand, if the error is not likely to cause significant revenue losses, the level of severity assigned to the error could be correspondingly low.

Figure 2:
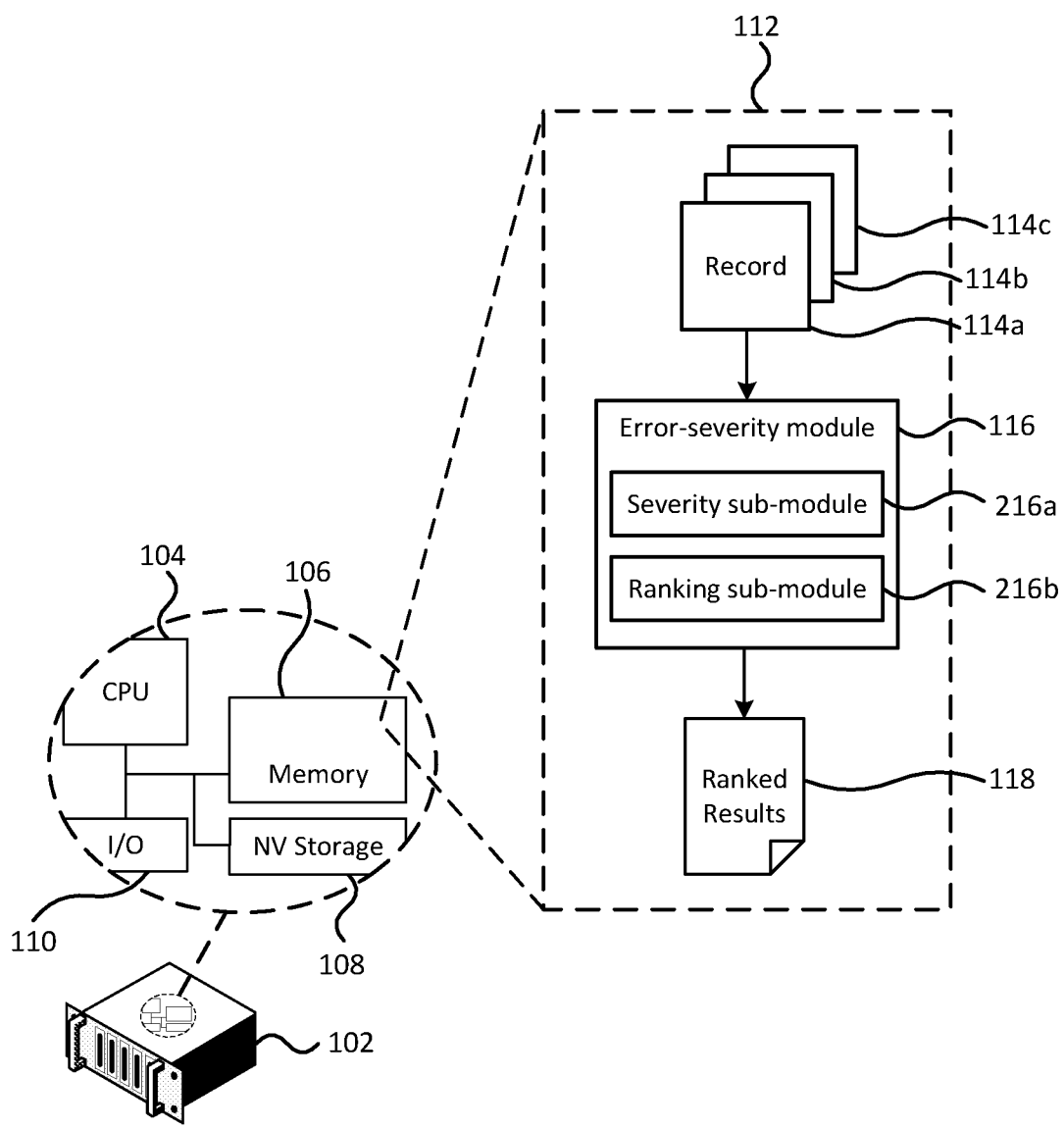
FIG. 2 is a block diagram illustrating another embodiment of the system of FIG. 1.

Additionally, in one embodiment, the error-severity module 116 comprises a single module that both assigns a level of severity to each error and ranks the errors. In another embodiment, the error-severity module 116 comprises two sub-modules: a severity sub-module 216a and a ranking sub-module 216b, as shown in FIG. 2. In this embodiment, the severity sub-module 216a determines the level of severity for each error and passes that information to the ranking sub-module 216b. The ranking sub-module 216b then ranks the errors as above. In such an embodiment, both the severity sub-module 216a and the ranking sub-module 216b can be either rules-based or machine-learning-based. As above, the results of the ranking may then be passed to at least one administrative user and/or used to create a schedule for correction/mitigation.

Figure 3:
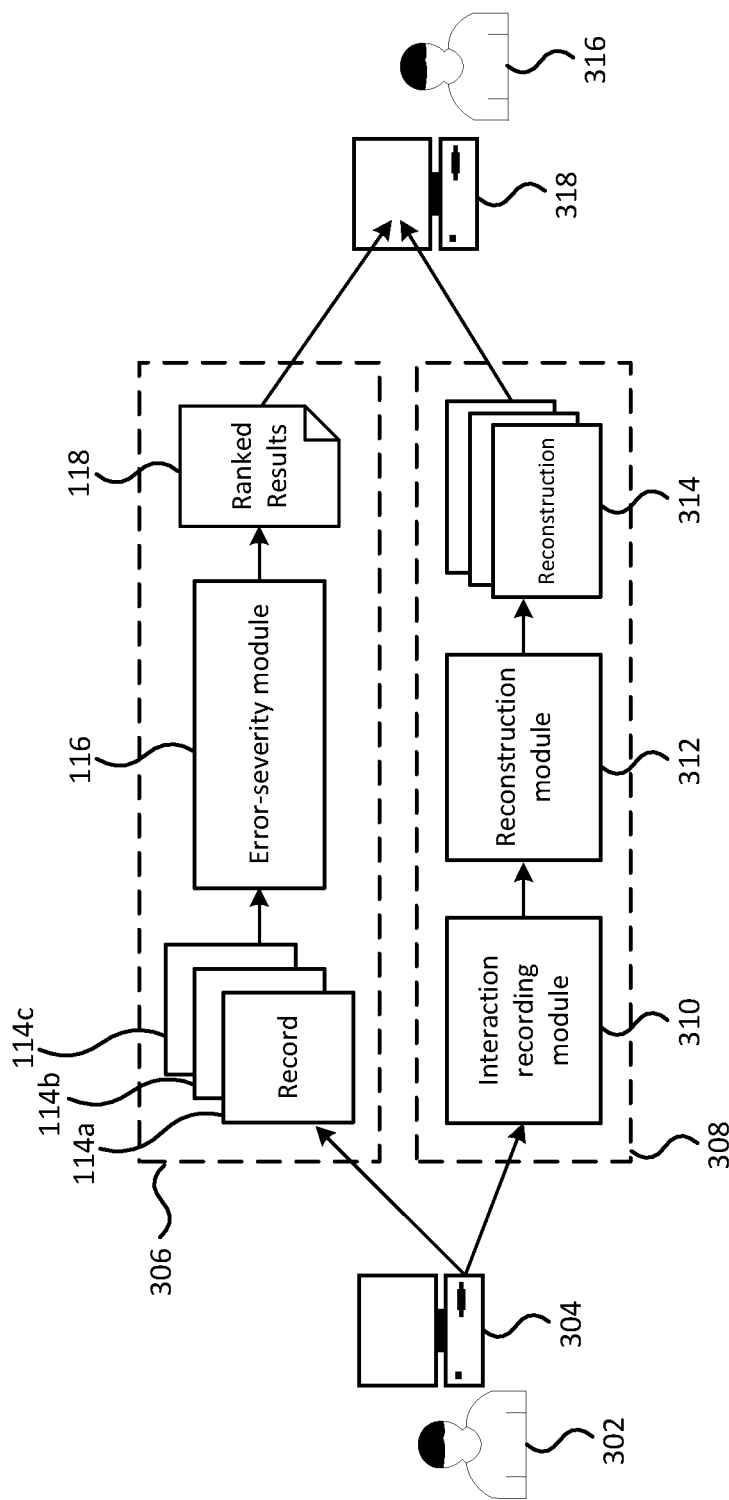
FIG. 3 is a block diagram illustrating another embodiment of the system of FIG. 1.

FIG. 3 is a block diagram illustrating another embodiment of the disclosure, in which, in addition to ranking errors, the system 102 further generates human-viewable reconstructions of each user session. In this Figure, a user 302 uses a computer system 304. This computer system 304 may be run on/accessed by a mobile device, a laptop or desktop computer, a server, and/or any other device capable of running the computer system 304. As an example, in some implementations, information may be collected from a server that hosts or supports a website which the user 302 accesses, and/or from the processor and web browser used to access/display the site. It should thus be understood that the user may use more than one device to run/access a computer system 304, either at different times or simultaneously. Further, of course, at any given time more than one user may be running/accessing the computer system 304, using multiple devices, limited only by any constraints on the computer system 304 itself. Thus, the user 302 and computer system 304 in FIG. 3 should be considered as comprising all such variations thereof. As represented by the dotted lines, the computer system 304 passes information related to the computer system 304 on to the system 102. This information may be passed wirelessly or over a wired connection, or in any other suitable manner.

Then, as seen in FIG. 3, there are two parallel 'pathways' in this embodiment of the disclosure. Each pathway 306, 308 generates information related to the computer system 304 and the error(s) therein, and passes that information to the administrative user 316, or more particularly a computer system 318 used by the administrative user 316. A first pathway 306 is the 'error-severity and ranking' pathway shown in FIG. 1 and described above. That is, records 114a, 114b, and 114c are based on the information passed to the system 102 from the computer system 304. As described above, these records 114 may be generated by a process or module external to the system 102 or by a process or a module, such as an error-record generation module, as described above, internal to the system 102. Additionally, in some cases the records 114 may be generated by the computer system 304 itself. It should be understood that the dotted lines are capable of representing any of these configurations, and/or any combination thereof. The records 114a-114c are then passed to the error-severity module 116, and assigned levels of severity and ranked as described above. The results 118 are then passed to an administrative user 316.

The second 'pathway' 308 in FIG. 3 is a 'video pathway'. The system 102 comprises an interaction recording module 310 and a reconstruction module 312, which produces a human-viewable reconstruction 314 of the user session. The reconstruction 314 may be in a video or image format.

Note that some embodiments of the system 102 may have an interaction recording module 310 without the reconstruction module 312. The interaction recording module 310 records all of the user's interactions with the computer system 304, based on information sent from the computer system 304. These interactions may be useful for determining correction/mitigation priorities, as well as for other kinds of analysis, whether or not they are processed into reconstructions 314. In particular, in some embodiments, the error-severity module 116 may communicate with the interaction recording module 310 and determine levels of severity for individual errors based on how the user interacts with the system before, during, and after those errors occur. That is, in some embodiments of the disclosure, the levels of severity may be based on user interactions whether or not those interactions are noted in an error record 114.

The interaction recording module 310 records the interactions are recorded as machine-readable data (for instance, as JSON files, which are well-known, or in similar file types). The machine-readable data is preferably anonymized, as far as possible. As should be clear, the level of anonymization may be set by an administrative user or users, and may depend on the sensitivity of the entered information and any legal permissions granted by the user 302. As one example, the interaction recording module 310 may record that keyboard input was entered by the user 302 and may record the field into which the input was entered, without recording precisely what the keyboard input was. Many other such anonymization techniques are well known in the art, and any suitable technique may be used.

Note that the information sent to the interaction recording module 310 may be the same or similar to the information on which the error records 114a-114c are based. That is, the error records may be based on all of the interaction information as well as on information related to the specific errors that occur. Alternatively, the interaction recording module 310 may only receive data related to the user's interactions with the computer system 304, while the records 114 may only be based on specific error information. The appropriate pathway for each kind of information may be determined by the administrative user 316 or by some other authority for the system 102 or for the computer system 304, or by configuration details of the computer system 304, of any network over which the system 102 operates, and/or of the user's computer system 304.

In some embodiments, each user session on a computer system 304 may be recorded as a single data file. In other embodiments, all of the information received by the information recording module 310 may be stored as separate data pieces in one or more databases, including both local databases and remote or cloud-based databases, such as the well-known BigQuery. In such database embodiments, each separate data piece from each individual user session would be associated via metadata related to that particular user session, to allow the entirety of the user's interactions with the computer system 304 to be understood.

The interaction recording module 310 continues to record interactions as long as the computer system 304 is passing information. Once the computer system 304 stops passing information (i.e., once the session is complete), the interaction recording module 310 finalizes the session file after a predetermined period of time. This predetermined period of time is set by an administrative user 316 and may depend on the specifics of the computer system 304. However, the predetermined period of time is preferably long enough that the user may occasionally pause during their session without the session being considered ended. For some computer systems, this predetermined time may thus be on the order of minutes, while for other computer systems, the predetermined time may be on the order of hours. Additionally, some computer systems 304 (for instance, some online games) may be configured in some implementations to continually produce a signal indicating that the user 302 is not actively using the computer system 304 but has not yet ended the session. In such an implementation, the interaction recording module 310 could continually receive this "paused" signal, or receive it at short intervals, so that the session file would not be pre-emptively closed. As another example, some computer systems may truncate a session if the user 302 does not respond within a certain time period. For instance, banking systems or other computer systems that display sensitive information may end the session if the user 302 pauses for 'too long'. Such systems could directly notify the interaction recording module 310 when each session is complete, thereby directing the interaction recording module 310 to finalize the session file. The above examples are not intended to be exhaustive: many other methods of determining when to finalize a session file may be known to the person skilled in the art, and should be considered as falling within the scope of the current disclosure.

Further, there may be actions that successfully end a session on a computer system 304 (i.e., the user ends the session after achieving their goals, rather than because of frustration and/or errors. For instance, after a user has successfully made a purchase, edited and saved a file, or signed up for a mailing list, they may end their session happily. Thus, it is preferable that the system 102, and specifically the interaction recording module 310 and the error-severity module 116, have some way of recognizing a successful end point of a session. Such success could be noted on a finalized session file, or an error record, depending on how the error records are produced, or by some other flag or signal.

As would be understood by the person skilled in the art, the session files containing recorded interactions can then be used in various ways and in various forms of analysis. As one example, the session files can be analyzed to identify occurrences that may not appear in error logs but nonetheless depart from the intended functioning of the computer system 304. For instance, if multiple users interact with the system in one way (e.g., clicking a specific button opens a pop-up window) while one user has different interactions (e.g., clicking that specific button refreshes the system and deletes all work), the interactions of the one user likely represent an error in the computer system 304. As another example, the interactions may be automatically analyzed, and/or analyzed by humans, to determine how to reproduce error(s). Such reproduction analysis may consider such factors as the length of time between any given interaction and the occurrence of the error(s), to determine which of the interactions are truly significant and related to the error(s). Preferably, also, such reproduction analysis would be based on the interactions of more than one user with the computer system 304, so that extraneous interactions can be more easily stripped out.

The machine-readable data recording the interactions can also be transformed into data that humans can examine. For instance, in the embodiment shown in FIG. 3, the system 102 further comprises a reconstruction module 312. The session file is passed to this reconstruction module 312 by the interaction recording module 310. The reconstruction module 312 then generates a human-viewable reconstruction 314, based on the machine-readable data in the session file, and passes that reconstruction 314 to the administrative user 316. If the reconstruction 314 is in a video format, the administrative user 316 can directly observe how the user 302 interacted with the computer system 304 before, during, and after each recorded error. This allows the administrative user 316 to see how the user 302 was affected by each recorded error (for instance, 'the user 302 did not notice the error', or 'the user entered a specific sequence of keystrokes', or 'the user 302 clicked 18 times in 10 seconds on a non-responsive button and then abruptly ended the session'). Thus, the reconstruction 314, along with the ranking results 118, aids the administrative user 316 in predetermining priorities for error mitigation and correction tasks.

Figure 4:
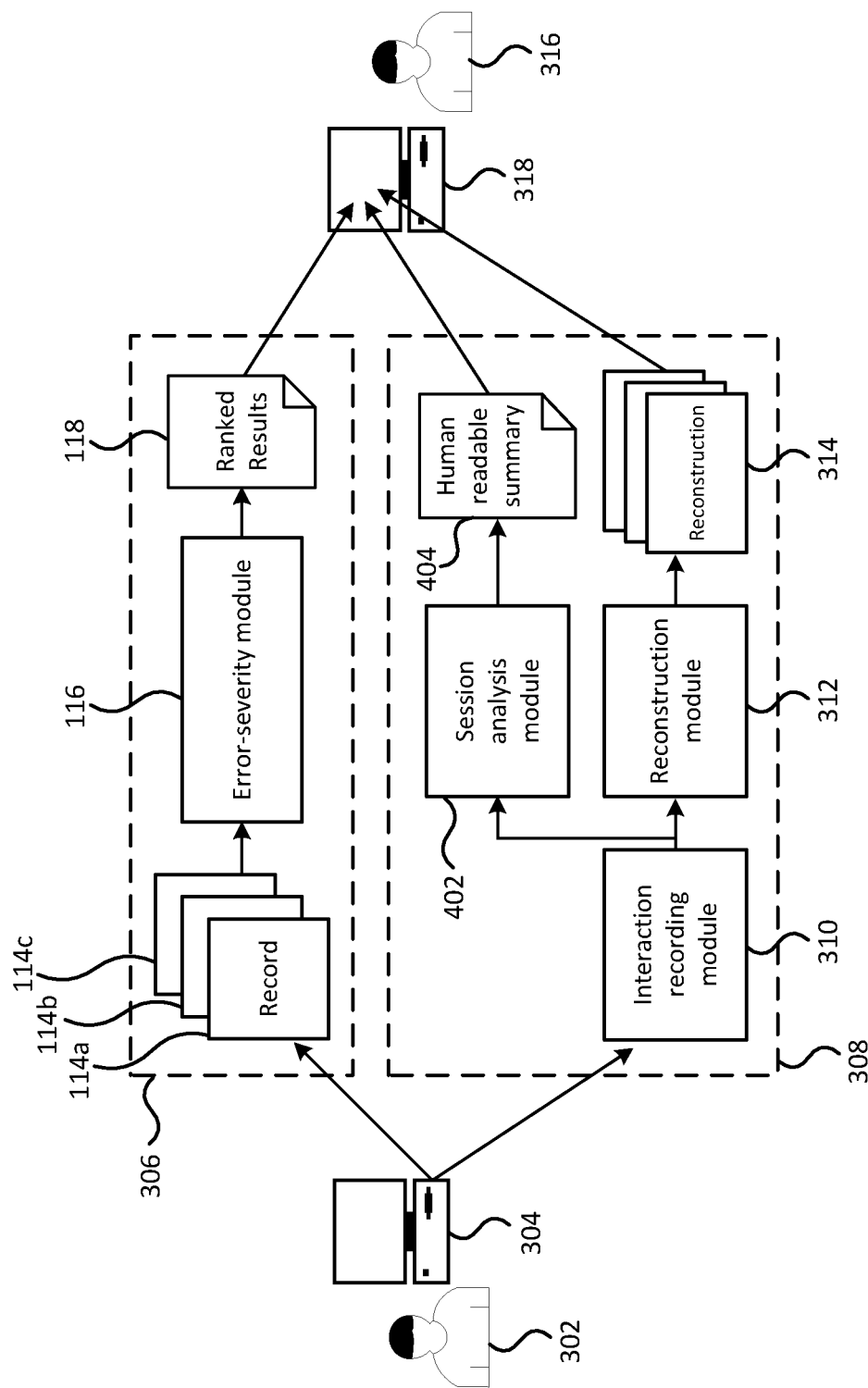
FIG. 4 is a block diagram illustrating still another embodiment of the system of FIG. 1.

In FIG. 4, another embodiment of the disclosure is shown. This embodiment of the disclosure is similar to that shown in FIG. 3. In particular, the error ranking and video pathways are the same in FIGS. 3 and 4. However, the embodiment of the disclosure shown in FIG. 4 further comprises a 'session analysis pathway'.

The session analysis pathway comprises a session analysis module 402 that receives the session file from the interaction recording module 310. The session analysis module 402 then analyses the session file and generates a human-readable summary 404 of the session. The human-readable summary 404 is then passed to the at least one administrative user 316. Such a summary 404 may in some cases be preferred to the video reconstruction 314. Additionally, the summary 404 may contain not only a summary of the user's interactions but also analysis of those actions. For instance, presented with the '18 clicks in 10 seconds' example above, the session analysis module may be able to inform the administrative user 316 that the user 302 ended the session out of sheer frustration. Using only the video reconstruction 314, the administrative user 316 would have to draw that conclusion for themselves.

As should be understood, the session analysis module 402 may be rules-based. However, again, considering the potential variation in errors and computer systems that is possible, and their rapid rate of change, the session analysis module 402 preferably is at least partially based on machine learning. Such a machine learning module may receive feedback from the administrative user 316 so that its algorithms continue to develop. Such feedback might include notes about errors that were not caught, or about false positives (features of the computer system that were incorrectly recorded as errors), or about errors that have been mis-ranked (placed either too high in the ranking results 118 or too low). The feedback could then be used in later analyses.

Additionally, the session analysis module 402 may in some embodiments communicate with the error-severity module 116, as elements of the severity analysis may be relevant to the session analysis and vice versa.

Further, as should be understood, the embodiment of the disclosure shown in FIG. 4 is merely exemplary. For instance, an embodiment of the disclosure may have a session analysis 'pathway' without having a reconstruction pathway. Additionally, various modules may communicate with each other. Further, depending on the specific implementation, some of the various modules may be merged with each other, or may be submodules of a larger module, or may be further subdivided.

Additionally, although only one user 302 is shown in FIGS. 3 and 4, this should not be taken as limiting the disclosure. Rather, as noted above, a single computer system 304 may have multiple simultaneous users, restricted only by the limits of the computer system 304 itself (if any). The system 102, and particularly the error-severity module 116, may use information and records from more than one user to predict the severity of any given error—for example, an error that occurs for 312 users simultaneously is likely far more severe than an error that only affects one individual user. Thus, the error that occurred for the 312 users should likely be given a higher rank.

Additionally, in some embodiments, the system 102 can consider errors occurring on more than one computer system 304. That is, in some embodiments of the disclosure, the system 102 may receive information about multiple distinct computer systems 304 simultaneously, as well as from multiple distinct users 302 and/or user devices 304. For instance, many websites use third-party tools or platforms in their back-end and/or architecture (as examples, many websites rely on Shopify™ and/or Amazon Web Services™). An error in one of those tools could thus affect many different computer systems. An error affecting multiple systems in such a way, or an error that has the potential to affect multiple systems, may be referred to as a "cross-system error". Cross-system errors may be assigned unique codes that can be used to identify them across the various systems. Depending on the implementation of the system 102, such cross-system errors may be considered very severe and thus ranked very highly.

Additionally, in some implementations, cross-system errors may be ranked extremely high, as they may affect multiple computer systems 304 using the system 102. Such a ranking is more likely when the ranking results 118 are to be used by an administrative user for the system 102, rather than by an administrative user of a specific computer system 304. That is, all cross-system errors may be severe from the perspective of an administrator of the whole system 102, while, for an administrative user of a specific computer system 304, a given cross-system error may be lower-ranked than other errors specific to that computer system 304. Additionally, the ranking results 118 for a specific computer system 304 may depend on the ranking results 118 for other systems having the same cross-system errors. For example, if a cross-system error is determined to be a high priority based on feedback from multiple different administrative users 316, that cross-system error may be automatically assigned a high ranking whenever it occurs. On the other hand, if multiple different administrative users 316 regard the cross-system error as minor, that error may be automatically assigned a low ranking whenever it occurs.

Further, it should be noted that a cross-system error does not have to occur simultaneously on every computer system 304 which that cross-system error affects. For instance, an error may be triggered by an operating system update. If two computer systems 304 are based on that operating system, and one of the computer systems 304 is updated, that computer system 304 will experience the error while the other, non-updated computer system 304 will not. Thus, it may be desirable to be able to warn the administrative user(s) of the second, non-updated computer system 304 about the error, and to advise them to wait until the error is resolved or "patched" (or otherwise mitigated) before updating.

Thus, another embodiment of the system 102 further comprises a prediction module for analyzing errors from the various distinct computer systems 304, identifying any cross-system errors, and predicting a likelihood that a specific cross-system error will occur on a specific computer system 304. Additionally, such a prediction module may also be used for predicting errors on a single computer system 304, for instance based on historical data related to that specific computer system. As an example, the prediction module may predict a likelihood that a certain intermittent error will occur during a certain session (for instance, if an error is known to occur on every 59th iteration of a specific process). Such a prediction module could thus be used even in embodiments of the disclosure that receive information from only one computer system 304.

This prediction module may be a stand-alone module, or may be a submodule or component of the error-severity module 116. Even if the prediction module is a standalone module, it may be preferable for the prediction module to communicate with the error-severity module 116, as some of the analysis performed by the error-severity module may inform the analysis performed by the prediction module, and vice versa.

Figure 5:
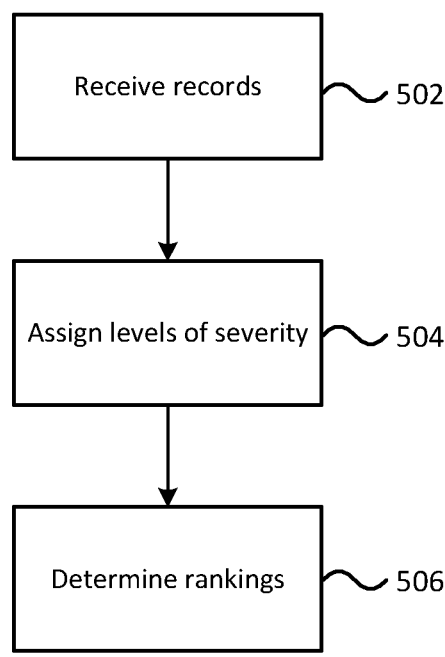
FIG. 5 is a flowchart detailing a method according to another aspect of the disclosure.

Turning now to FIG. 5, a flowchart detailing a method according to one aspect of the disclosure is illustrated. Records of errors in at least one computer system 304 are received (502). As described above, the error records may be generated in numerous ways, all of which are encompassed by the present disclosure. A level of severity is assigned to each error represented by an error record (504). The level of severity is determined and assigned as described above, that is, at least partially based on the error record and on information therein. The errors are then ranked, based at least in part on the level of severity assigned to each error (506). The results of the ranking process may then be used in determining priorities for correction of the error(s) and/or mitigation of the effects of the error(s).

The above has described a system for assigning a severity level to errors that can be used for ranking the errors in order to prioritize addressing the errors. While the above has been described with regard to various different computer systems and applications. As described in further detail below, assigning a severity indication to errors may be of particular use for evaluating errors in an e-commerce application. The e-commerce application may be provided as an app or application running on a computer or smart phone. Additionally or alternatively, the e-commerce application may be a website. Regardless of how the e-commerce application is presented to users, the application may interact with one or more servers in order to carry out a transaction. Broadly, a user may access the e-commerce application, browse items that may be purchased, add one or more items to a virtual shopping cart for purchase, and then may checkout to purchase the items. That is a user may progress from 'on site' to 'added to cart' to 'check out started' to 'place order'. These stages provide a multi-stage progress funnel for the e-commerce application. Generally, users progress from each stage to the next with some users failing to progress to each next stage. That is, not everyone who accesses the e-commerce application will browse items in the application, not all users that browse items will add an item to the cart, and not all users that add an item to the cart will begin the checkout process. It will be appreciated that application errors can occur at any stage in the progress funnel, and errors may either prevent a user from progressing further or may make it more difficult for the user to progress further. While some errors may impact a user's ability or desire to complete a transaction using the e-commerce application, other errors may be largely unnoticed by the user. An e-commerce application may have a large number of errors that may range from highly impactful to the user to unnoticed by the user. In order to address application errors, a developer or developers determine the cause of the error and then correct it. Limited resources may mean that not all of the errors in an e-commerce application may be fixed in a timely manner. Assigning a severity level to errors may allow a developer or developer to prioritize correcting errors that may have the biggest impact.

As described further below, the severity level may be provided as an amount of money lost as a result of the error. It is possible to estimate an amount of money lost because of errors experienced by users, or that would be lost if the error is not corrected. A user session with the e-commerce application can collect information, including for example any requests to a remote server as well as the results of the requests, including possible errors, either in receiving the request, or in processing the results. For example, if the request is a HTML request, the result may indicate an error, such as an internal server error (i.e. an html 500 error). As a further example, if the request is for a web site or page that includes JavaScript, or other scripting language, processing the results may include executing the JavaScript which may generate an error. The collected session information of multiple users can be processed to identify statistics of users of the e-commerce application progressing through the multi-stage funnel. The collected session information may include information from both users experiencing various errors, as well as users that did not experience the particular errors. By comparing funnel progression statistics for users experiencing a particular error to the funnel progression statistics for the e-commerce application as a whole, it is possible to determine an impact the error may have on the number of completed transactions. This may be converted to a dollar amount using an average checkout value for the e-commerce application. Accordingly, it is possible to determine a dollar value impact a particular error may have and as such can be used to prioritize correcting errors.

Figure 6:
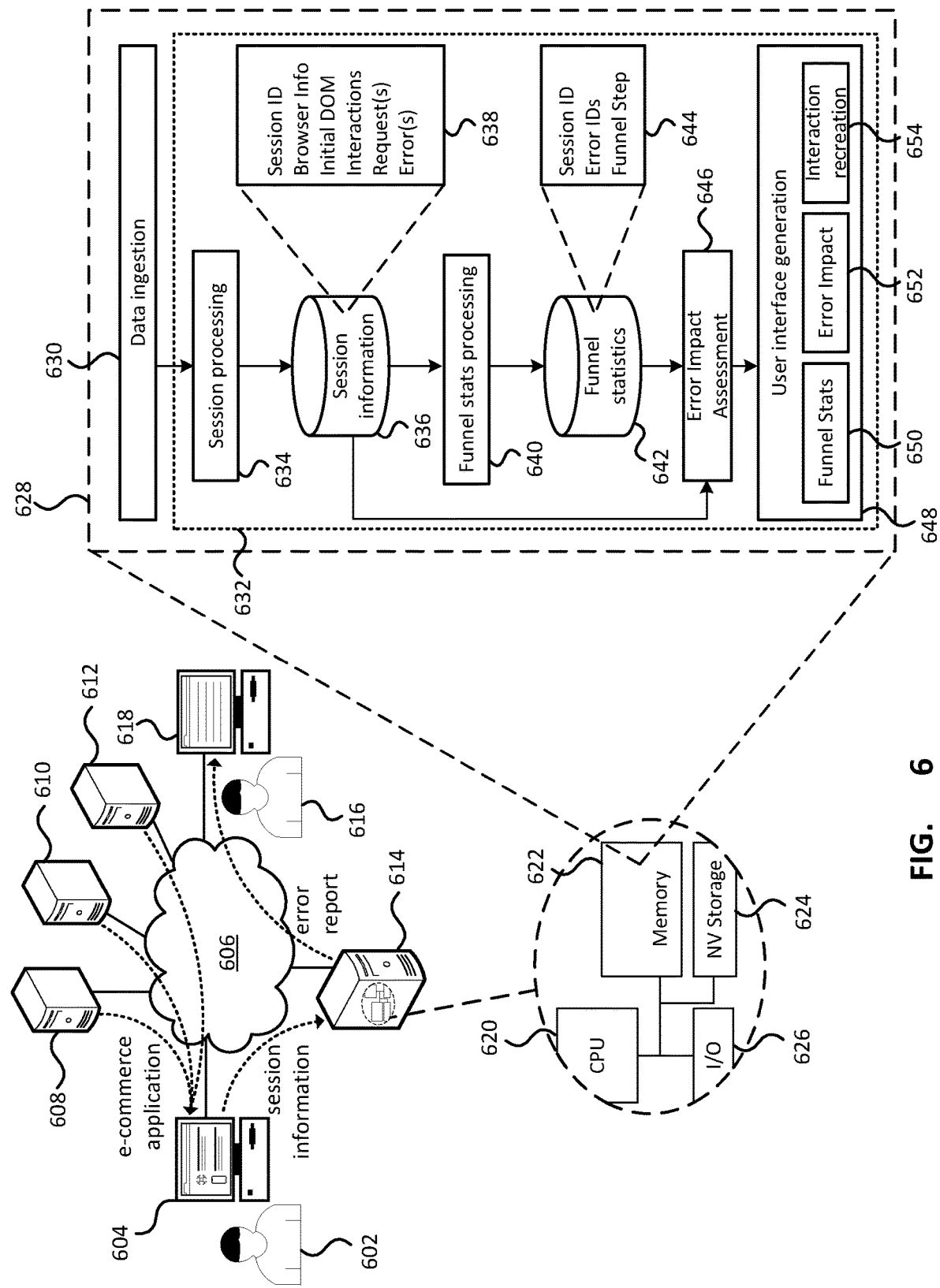
FIG. 6 depicts components of system for evaluating errors in an e-commerce application.

FIG. 6 depicts components of system for evaluating errors in an e-commerce application. A consumer 602 or user of an e-commerce application may use a computing device 604 connected to a communication network 606, such as the internet, to access one or more servers 608, 610, 612 that provide the e-commerce application to the computing device 604. For example, the e-commerce application may be a shopping website that is hosted by a web server 608. The e-commerce application may utilize functionality provided by other servers, which may include for example, a payment processing server 610 and/or an advertising server 612. It will be appreciated that the arrangement of servers providing the e-commerce application is only illustrative and other arrangements are possible. The e-commerce application may be provided as a website accessed through a browser on the consumers computing device 604, or the e-commerce application may be provided as an application or app running on the computing device that communicates with one or more of the servers 608, 610, 612 to provide the functionality of the e-commerce application.

The e-commerce application may incorporate session tracking functionality that is used to evaluate errors in the e-commerce application. The session tracking functionality may be incorporated into the e-commerce application, for example as a downloadable script embedded in a webpage of the e-commerce application. Additionally or alternatively, the session tracking functionality may be provided as a component or plug-in of the browser used to access to the e-commerce application. The session tracking functionality tracks the user's 602 session on the e-commerce application and collects the session information including requests made to the servers 608, 610, 612 as well as the results of the requests. Additionally, the session tracking functionality may collect information about the processing or running of requested components. For example, the e-commerce application may request an html page which may include a script to be executed. The session tracking functionality may monitor the results of the script execution in order to detect any errors that may have resulted from the execution. Further, the session tracking information may collect information about the computing device 604 used to access or run the e-commerce application, such as an operating system, browser version, plug-ins etc. This information can be helpful in determining causes of problems. Additionally, the session tracking information may also track other information about the session including the user's interactions with the e-commerce application.

The session tracking functionality may run on the user's 602 computing device 604 for collecting information about the operation of the e-commerce application. Additionally, it is possible to include session tracking functionality as part of one or more of the servers 608, 610, 612 in order to collect information about possible errors on the server side. In order to combine session information collected at the user and server side, a session ID, or other identifier that can be identified on both the user and server side may be used. For example, the client side session tracking information may generate a unique session ID, or possibly a unique request ID, that is included in any request sent to a server. The server may include the session or request ID in the server side session ID in order to allow joining the related session information collected by the client and the server(s).

The session information is sent to a computing device 614 that provides error evaluation functionality. The session information may be collected at the client and sent once the session is completed. Alternatively, the session information may be periodically sent to the error evaluation computer 614 throughout the session. The error evaluation computing device provides functionality for receiving session information from multiple different users and generating error reports that can be presented to a developer or developers of the e-commerce application, or a component of the e-commerce application. The error reports may be provided as a website accessed by a computing device of the developer 618. It is desirable for developers to limit access to the error reports to certain people, such as members of the development team, employees, etc. and as such the website providing the error reports may use user names/passwords to limit access. Although it may be generally desirable to limit access to authorized users, in some scenarios it may be desirable to provide access to error reports to individuals that do not have authorized accounts. For example, if an application error is generated from a payment provider's server, it may be desirable for the developers of the e-commerce application to provide access to the error reports to payment provider's developers who may not have a user name/password. In such cases, access to a specific error report, or portion of the error report may be provided without requiring a password. The access may be provided through a randomized link that uses a long random character sequence in the website address so that it is highly unlikely that anyone other than the intended recipient will access the link.

The error evaluation computer 614 comprises at least one processing unit 620 for executing instructions. A memory unit 622 stores data and instructions that are executed by the processing unit 620. The memory unit 622 may provide volatile short term storage, however the system 614 may also include non-volatile storage 624 for additional storage. The system may include one or more input/output (I/O) interfaces 626 for connecting one or more additional components to the system 614. The instructions stored in the memory 622 can be executed by the processor 620 to provide various components 628 as described further below.

The components 628 include a data ingestion component 630 that receives session information from a plurality of different users of one or more e-commerce sites. The data ingestion functionality 630 may provide functionality for collecting and formatting session information. For example, if session information is provided periodically throughout a user's session, the data ingestion functionality may aggregate the different pieces of session information together. Additionally, the ingestion functionality 630 may format the information into a common or expected format. Further, the data ingestion functionality may enhance the session information received from user's computers with additional information. For example, the session information may be enhanced with user account information, time stamps associated with when the session information was received, or other such information.

The session information may be processed by error-severity functionality 632 that can determine the severity of errors included in session information. The severity of the error is provided as an estimated impact of the error as an amount of money lost as a result of the error. The functionality includes session processing functionality 634 that receives session information from a plurality of different users and stores the information in a data store, depicted as session information database 636. The session processing functionality may process the received session information in order to store the information in a desired format. The session information may be stored in various different formats, however, the session information of an individual session 638 may include for example, a session identifier used to identify the particular session, browser/computer information of the computing device used to access the e-commerce application, an initial document object model (DOM) of the browser for the e-commerce application. The initial DOM may represent an initial state of the browser when the e-commerce application is accessed. The session information may include information on user interactions, such as mouse movements, keyboard inputs, buttons clicked etc. The interactions may include time stamps on when the interactions occurred. The initial DOM and interactions may be used to reconstruct a user's session. The session information includes information on requests made by the e-commerce application as well as possible errors. For example, the e-commerce application may generate html requests as the user interacts with the e-commerce application. The html requests can be collected along with the results of the requests such as the information returned along with possible errors resulting from the request. The errors may include HTML errors, such as 4xx or 5xx series errors, or other errors such as JavaScript errors resulting from executing scripts.

The errors may include a unique error ID that can be used to identify occurrence of the same error across different user sessions for the same e-commerce application. The unique error ID may be for example, an HTML error code and a URL associated with the error. For JavaScript, or other script errors, the error ID may be provided as an indication of the script file that caused the error as well as a stack trace of the error. Additional error information may be included in the session information, possibly by the session processing functionality 634. For example, JavaScript is downloaded to a computer as a text file and in order to reduce the file size the files may be minified, which is a process of removing all unnecessary characters. This process results in a small file size, however it makes it difficult read the JavaScript and to correlate line numbers causing errors to the actual code that caused the error. The additional error information may provide a link between the minified JavaScript file and the full JavaScript file so that line numbers identified in the stack trace of a minified file can be mapped to line numbers of the full JavaScript file.

The session information 638 stored in the session information data store 636 may include session information for multiple different e-commerce applications. The session information for the different e-commerce applications may be stored in separate databases, tables, etc. or may include other means for separating the different e-commerce applications, such as an application identifier. Different e-commerce applications may experience the same or similar errors, however if the error ID uses a URL to identify the error, the error ID will not identify the same errors across different e-commerce applications. An issue ID can be used to identify common issues across different e-commerce applications. Tracking common issues across different e-commerce applications may allow improved analysis, including for example providing estimates on an amount of time required to fix an issue. That is, developers of a first e-commerce application may provide feedback indicating how long it took for developers to fix an issue, and the issue ID can be used to provide this information to a developers of a second e-commerce application experience the same issue.

As described above, e-commerce applications typically follow a multi-stage progression funnel. As consumers progress from one stage to the next in the funnel, a certain number of consumers will drop off and not progress to the next stage. User's moving to each stage of the funnel can be determined from interactions with the e-commerce application. For example, a request to a URL associated with adding an item to a shopping cart can indicate that the consumer has progressed to the added to cart stage. Funnel stats processing functionality 640 can process the session information to identify funnel progression statistics, which can be stored in a funnel stats data store or database 642. Although depicted as being stored separately from the session information, it is possible for the funnel stats to be stored in various different ways and formats. For example the funnel statistics 644 may store a number of different records having a session ID, the error IDs associated with the session as well as a funnel stage that the user progressed to. It is noted that this information may be stored as part of the session information although depicted as being separate clarity of the description. The funnel statistics may be used to determine, for example the average statistics for the e-commerce application as a whole. The funnel stats may provide a total number of users that progress to each stage. Additionally, the funnel stats may be periodically calculated, for example daily, weekly, monthly, etc. Different funnel stats may be determined, such as the funnel stats for the past day, week, month, 90 days etc. Additionally or alternatively, the funnel stats may be calculated dynamically as needed. In addition to the average funnel stats, which may consider all sessions, the funnel stats for a particular error may also be calculated. For example, all sessions having a particular error ID can be identified and the user's funnel stage in each of the identified sessions can be used in determining funnel stats for the error.

Error impact assessment functionality 646 may use the determined funnel statistics can be used to determine an impact of particular errors. By comparing the funnel stats for the e-commerce application as a whole to the stats for a particular error, it is possible to identify the potential lost revenue associated with the error. For example, the funnel stats may indicate that all user's experiencing a particular error do not check out. The funnel stats may be combined with session information to identify a potential number of users the error impacts. For example, the session information may indicate that 1% of users experience the particular error preventing them from checking out. Using the session information and funnel stats, a number of potentially lost transactions resulting from the error may be determined. Once the number of lost transactions has been estimated, the financial impact can be determined using an average transaction amount for the e-commerce application. The average transaction cost may be supplied by the developer of the e-commerce application, or may be determined from session information if details of users purchases are collected with the session information.

While the above has described an error which completely prevents users from checking out, it is possible for users experiencing the error to checkout, or progress to a next stage of the progress funnel, however they may be less likely to do so. The same process may be used to determine an impact of errors that do not fully prevent a user from progressing to the next stage by determining a difference between the average funnel stats and the error specific funnel stats along with a number of users that experience the error.

User interface generation functionality 648 generates a user interface that provides a report on the errors of the e-commerce application. The generated user interface may be a website or web page that allows an administrator to investigate the presented information. User interface generation functionality may include functionality for incorporating funnel stats 650 into the user interface, incorporating error impact information 652 into the user interface as well as interaction recreation functionality 654 for incorporating a recreation of a user's session into the user interface. The funnel stats functionality 650 may retrieve funnel stats information and format them for inclusion in the user interface. The funnel stats information may allow exploring errors associated with different stages of the funnel. Error impact functionality 652 can format and present information on the errors in the user interface. The information may include the possible lost revenue associated with the error, as well as other information useful for evaluating the error, including details of users experiencing the error such as their browser/computer information. The interaction recreation functionality 654 may generate a video or other recreation of the user's interactions with the e-commerce application that led to an error.

The user interface can be transmitted to the developers in order to evaluate the errors and prioritize which errors to address. For example, errors that have the largest financial impact may be prioritized for fixing first. It will be appreciated that other factors in addition to the financial impact can be used in ranking or prioritizing errors. For example, an estimate of how long or how hard an error will be to fix may be considered in prioritizing the fixing of errors. A length of time needed to fix the error may be estimated in various ways. For example the user interface may allow a developer to provide an indication of when fixing of a particular error was begun and when it was completed, additionally or alternatively, the length of time may be provided by one or more developers familiar with the error.

The generated user interface can present various information about the e-commerce application to developers. The information presented may be helpful to the developers in evaluating the error and determining its causes and how best to fix it. The information may be presented in a manner that is familiar to developers. For example, browsers typically have a view that allows developers to investigate various issues. Information collected about the errors may be presented in a similar manner.

In addition to presenting a user interface for errors, it is possible for the system to present notifications to developers that are not related to a specific error. For example, the system described above collects session information that can be processed to determine a number of users moving through the e-commerce application funnel. If the numbers detected over a particular of time deviates significantly from historical numbers, and notification may be sent to the developer indicating a potential unknown error.

Figure 7:
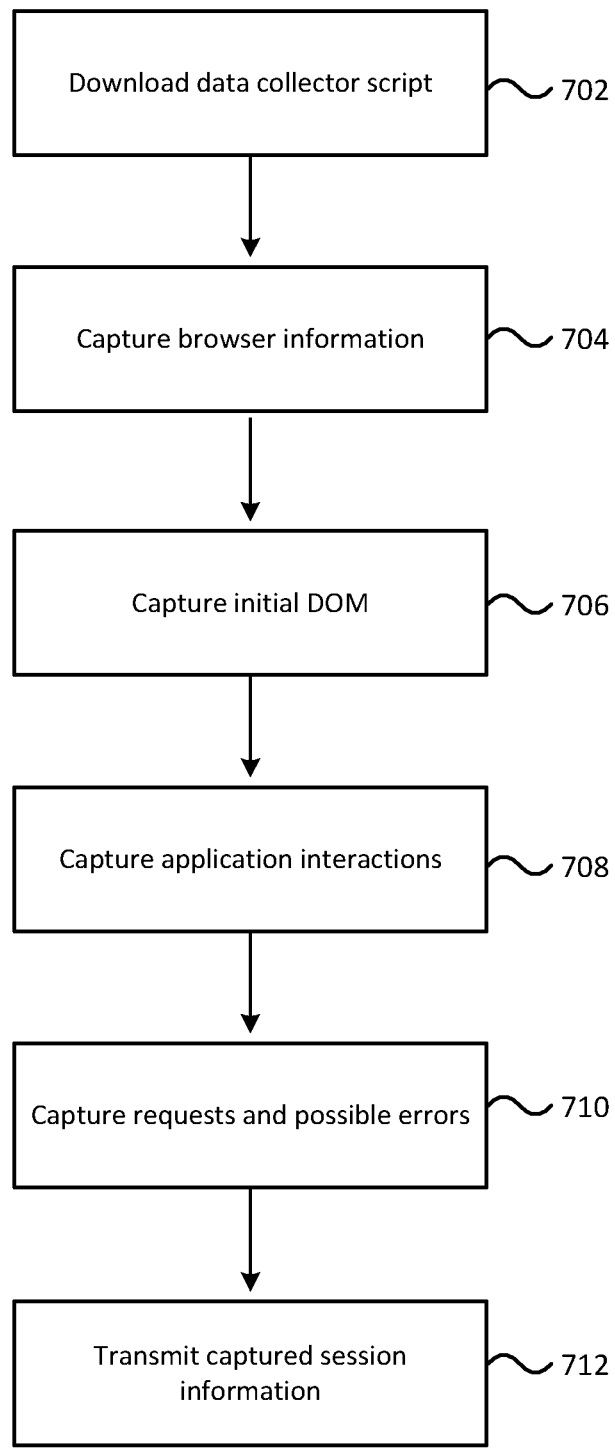
FIG. 7 depicts a client side method of collecting session information for an e-commerce application.

FIG. 7 depicts a client side method of collecting session information for an e-commerce application. As described above, session information is collected from users accessing the e-commerce application. The data collector may be provided as a script that is downloaded and run as part of the e-commerce application. The data collector script may be an initial script downloaded and run in order to capture any potential errors resulting when loading the e-commerce application. The method 700 begins with downloading the collector script (702) which is then executed and captures browser information (704). The browser information may provide information about the browser version, plug-ins, etc. as well as information about the operating system of the user's device. The data collection method may capture initial document object model (DOM) (706) of the e-commerce application. The DOM provides an initial starting point view of the application. Application interactions, such as mouse movements, clicks, keyboard inputs, buttons clicked, scrolling, etc. are captured (708), which in coordination with the initial DOM and browser information may be used at a later point in time to recreate the user's particular session. Requests such as HTML requests and the results, possibly including resulting errors, are captured (710). The captured information transmitted (712) to the error evaluation server for further processing. The information may be collected and packaged together for transmission at once, or the information may be transmitted as it is captured. Alternatively, captured data may be collected for a short period of time and sent together throughout a user's session.

Figure 8:
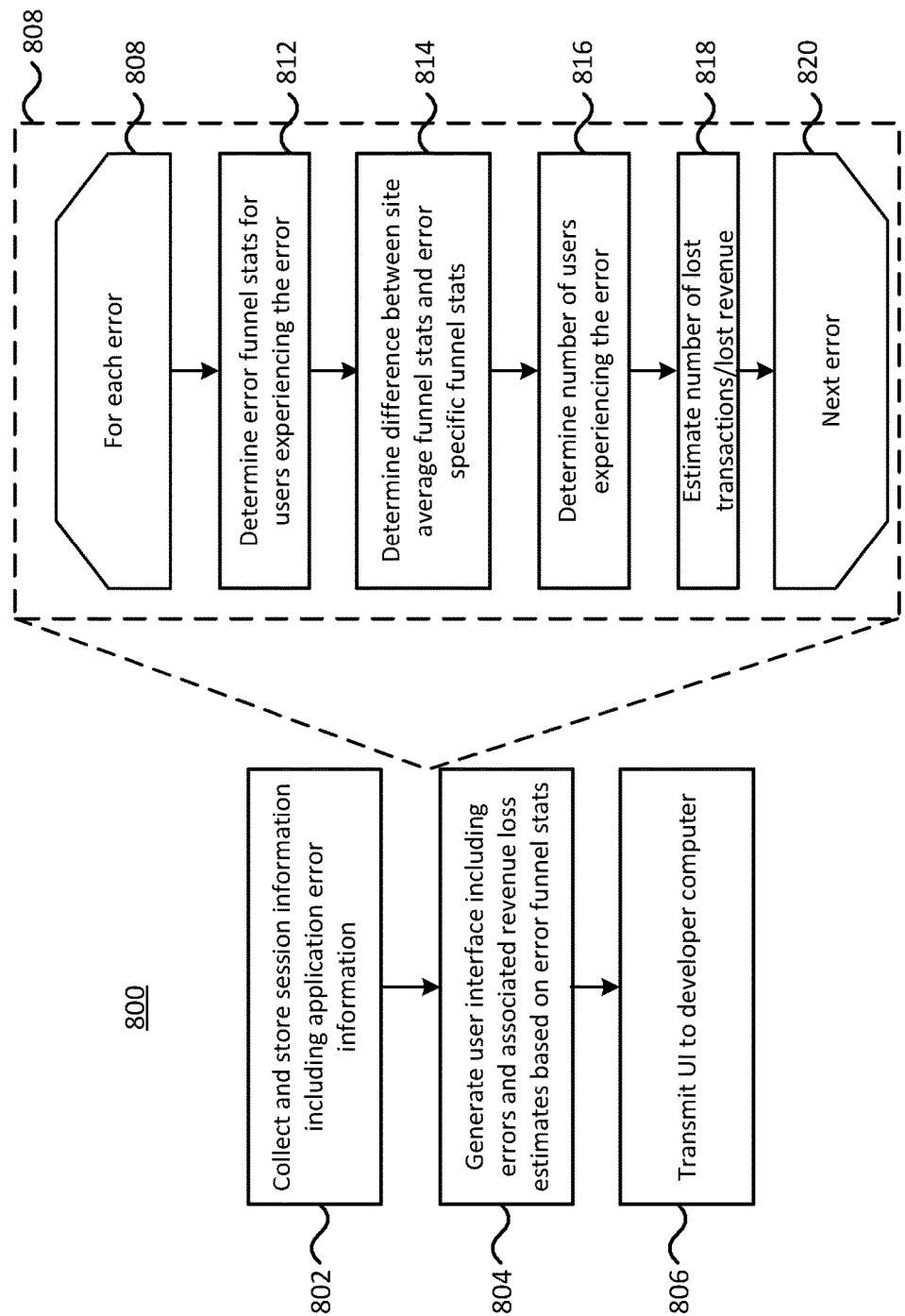
FIG. 8 depicts a method of evaluating errors in an e-commerce application.

FIG. 8 depicts a method of evaluating errors in an e-commerce application. The method 800 may be implemented by, for example, the error evaluation server described above. The method collects and stores session information (802). The session information is collected from data collectors which may execute as part of the e-commerce application. The data collectors may run a user's device and possibly servers providing one or more portions of the e-commerce application. The collected session information may include information from users that have experienced one or more errors as well as users that have not experienced any errors. It is noted that for e-commerce applications, it may be unusual for a user to experience no errors at all. The session data is collected and stored over a period of time that can provide averages of user experiences. For example, collecting session information over a month may provide enough user sessions so as to be representative of average user experiences.

The collected session information is used to generate a user interface that includes information on errors experienced by users along with an estimated revenue losses for the errors that are determined based on error progression funnel statistics (804). As described, the funnel statistics for the site as a whole and users experiencing a particular error, along with an amount of users experiencing the particular error, may be used to estimate a number of transactions lost based on a difference between the different funnel stats. The number of transactions lost may take into account the progress statistics for subsequent stages. The lost transactions can be used to estimate an amount of potentially lost revenue resulting from an error. Once the user interface is generated it is transmitted (806) for example to a developer or developers that can use the presented information to allocate resources to fixing the identified errors.

When generating the user interface, the amount of lost revenue due to an error may be determined. This determination may be a simple database look up for information that was previously determined or may be done as the interface is generated. Regardless of when the lost revenue is calculated, it can be done in a similar manner as depicted by the lost revenue determination method 808.

Calculating lost revenue can be done for a plurality of errors, such as all of the errors, a subset of errors displayed in a user interface, a set of selected errors, etc. For each of the errors (808), error funnel statistics for users experiencing the error are determined (812). The funnel statistics provide an indication of the number of users that progress from one stage in the multi-stage funnel to the next. The stats may be provided as absolute numbers, normalized numbers, or percentages. The difference between the site average funnel statistics and the error funnel statistics is determined (814), which provides an indication of the impact on the number of transactions for users experiencing the error. An estimate of the number of users experiencing the error is determined (816), for example by comparing the total number of users to the number of users experiencing the error. The number of users experiencing the error and the error's impact on the funnel stats may then be used to estimate an amount of lost transactions and/or lost revenue (818), which can be determined as the number of lost transaction times the average transaction amount. The lost transactions/revenue can be provided, for example for inclusion in the generated user interface. The next error (820) may be processed in a similar manner.

The lost revenue resulting from an error can provide an important indication as to the level of severity of an error. This information, along with other relevant information that can be used to identify the cause of errors, can be presented to developers of the e-commerce application or portions of the application. It will be appreciated that the user interfaces can present the information in a wide variety of ways. Examples of screens of a user interface are depicted below with reference to FIGS. 9 to 11.

Figure 9:
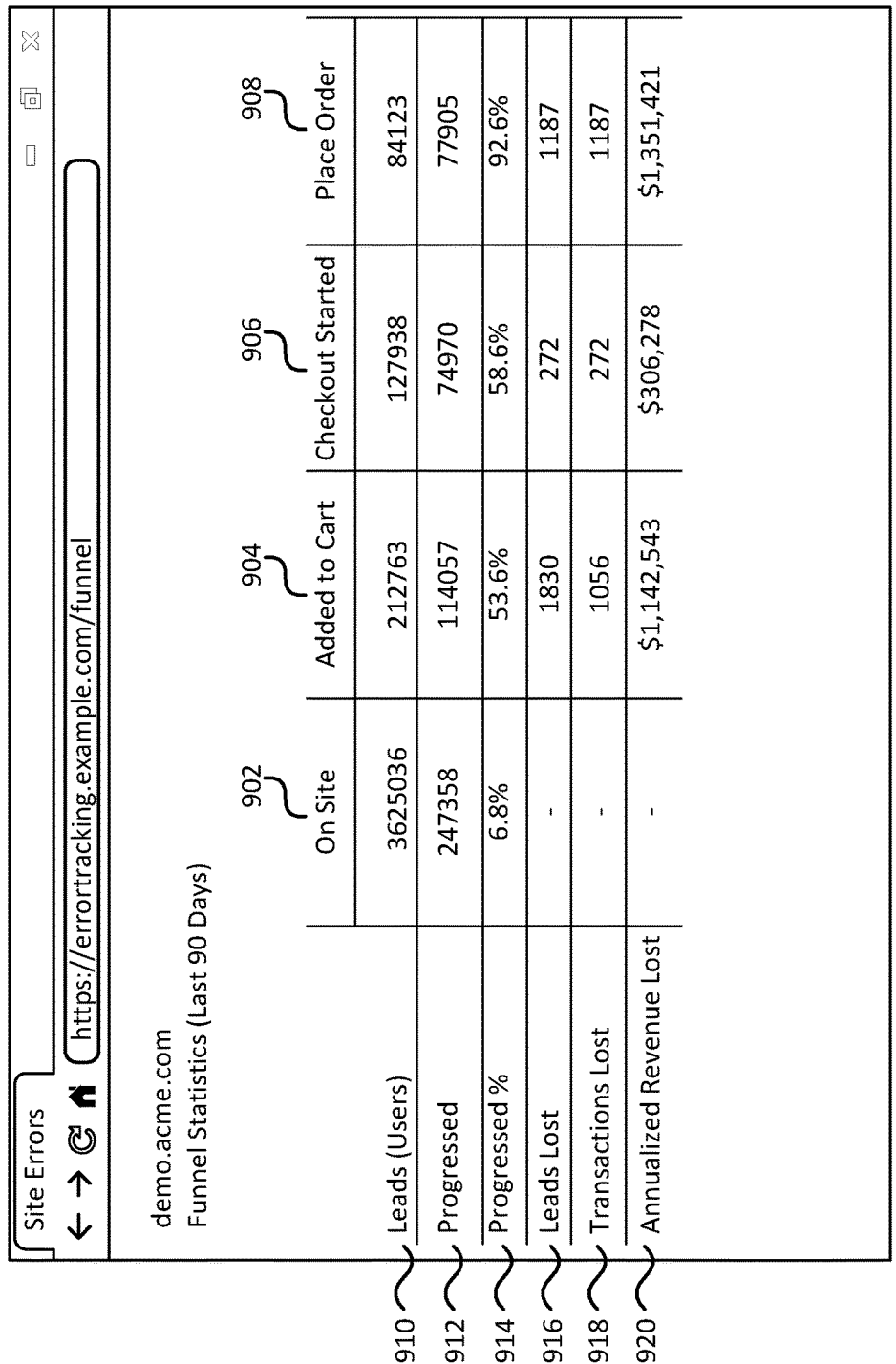
FIG. 9 depicts a user interface for use in evaluating errors in an e-commerce application.

FIG. 9 depicts a user interface for use in evaluating errors in an e-commerce application. The user interface 900 depicted in FIG. 9 provides a display of funnel statistics. As depicted, the funnel statistics include statistics for each stages of a multi-stage funnel. The stages include an on-site stage 902, an added to cart stage 904, a checkout stage stages 906 and a place order stage 908. Each stage may include information on the number of leads or users 910 for the respective stage, a number of leads/users that progressed to the next funnel stage 912, a percentage of leads that progressed to the next funnel stage 914, number of leads lost 916 and transactions lost 918 as well as an annualized revenue lost 920. The leads lost provide an estimate of the number of leads/users that would have otherwise have progressed to the next funnel stage if the error did not occur. The transactions lost provides an estimate of the successful transactions that would be lost as a result of the error and takes into account the progress % of subsequent funnel stages. It is noted that the leads lost, transactions lost, and revenue lost may be determined as the sum of all leads, transactions or revenue lost for all errors associated with each funnel stage. The user interface may allow a user to interact with the information displayed. For example, clicking on an amount of transactions lost may provide an interface showing the errors associated with the particular lost transactions.

FIG. 10 depicts a further user interface for use in evaluating errors in an e-commerce application. The interface 1000 depicted in FIG. 10 may include funnel statistics for each stage of a funnel and may show both the average for the application as well as the statistics for a particular error over a particular period of time, such as 90 days. The funnel stages may include an on-site stage 1002, an added to cart stage 1004, a checkout started stage 1006 and a place order stage 1008. Similar to FIG. 9, each stage may include information on the number of leads or users 1010 for the respective stage, a number of leads/users that progressed to the next funnel stage 1012, a percentage of leads that progressed to the next funnel stage 1014, number of leads lost 1016 and transactions lost 1018 as well as an annualized revenue lost 1020. The interface 1000 depicts both the average site statistics as well as those for a particular error. As will be appreciated, only leads, transactions and revenue lost are calculated for the errors. The statistics for a particular error are depicted in FIG. 10. The particular error only impacts the placed order stage and as such, there is no difference between the actual leads and progressed stats for the different stages. It is noted that the numbers are shown as being identical for clarity of the description, however in practice, they will not be identical. A threshold value may be used and variances from the average site statistics below the threshold may not be considered further. For example, changes in the funnel statistics of a progressed % less than 10% may not be considered as significant. As depicted users experiencing the particular error of FIG. 10 are significantly less likely to progress from the placed order stage, that is successfully complete their transaction. The revenue lost can be determined using an average cart amount, which in FIG. 11 is assumed to be $50. Accordingly, if the particular error is not fixed, it may result in lost revenue of nearly $1.5 million.

It is noted that leads lost 1016 is the number of leads or users that did not progress to the next stage as a result of the particular error. The lost transactions is similar, however takes into account the progress % statistics for subsequent stages.

FIG. 11 depicts a further user interface for use in evaluating errors in an e-commerce application. The interface 1100 depicted in FIG. 11 may provide a ranked or ordered list of errors. The interface may include information on each of the errors, including for example an issue ID 1104, an indication of when the error was first and last seen 1104, a unique error ID 1106, annualized revenue lost 1108 and an indication of the difficulty of fixing the error 1110. It will be appreciated that an individual error could be clicked on to allow a developer to investigate the error and view, for example, sessions that included the error as well as the information associated with those sessions.

The errors may be ranked or ordered based on the annualized revenue loss as depicted. Alternatively, the errors could be ordered on other characteristics or combination of characteristics. For example, the errors could be ordered based on the annualized revenue loss weighted based on the difficulty of the fix, such that easy fixes that result in a large amount of lost revenue are ordered higher compared to difficult fixes that cause similar amount of lost revenue. The fix difficulty may be presented in various ways, including as a general description as depicted such as 'easy', 'medium', and 'difficult' or 'unknown' if there is no information available on fixing the error. Alternatively it could be provided as an estimate of a developer's time, or other measures such as a score or ranking that provides an indication as to the difficulty in resolving the error. Such a resolvability score may allow the system to rank issues based on how easy and quick they are to resolve so that developers can prioritize their efforts where they should be able to quickly correct errors that result in substantial lost revenue. The resolvability score may be calculated using a number of factors including, for example, an average time to resolve the issue for other companies, how good the information on the error is, such as whether or not there is a good non-minified JavaScript stack for the error an whether or not there are good sessions for playback of the error to understand the impact and what happened. A good session for playback and understanding the error would be a session that captures a user's action or actions that resulted in the error and may provide good information for identifying the possible issue, including possibly eliminating possible causes from consideration. For example, good session could a session in which the system detected the user struggling such as "trying multiple payment gateways", "repeatedly pressing a button where that button caused nothing to happen", etc. Additional information may include, for example whether the issue is still occurring and as such may be more easily investigated.

The user interface provided may include functionality for assigning, or indicating that the error has been assigned to, one or more of the errors to a developer, developers, team, etc. for addressing the error. The functionality for assigning the error for correction, or providing an indication that the error has been assigned for correction, may be leveraged for determining a resolvability score for errors. For example, if two different companies or domains experience the same error, which may be determined using for example a unique error ID or issue ID, and both companies assign the issue to a developer to correct and for the first company the issue stopped appearing 1 week after being assigned and for the second company the issue stopped appearing 3 weeks after being assigned, the time to resolve the issue may be determined as the average time, or 2 weeks. If a third company experiences the same issue, it may be assumed and presented to the company that the issue will take 2 weeks to correct.

The feedback of different companies or domains on particular errors can be used to feedback or information to other companies or domains for the same particular errors. The errors may be identified across domains in various ways. For example, if the particular errors for the different companies may be associated with a common issue ID or other identifier. The feedback provided may be used to indicate or determine a difficulty in correcting the error, or providing other information such as determining a priority or impact of an error.

It should be clear that the various aspects of the present disclosure may be implemented as software modules in an overall software system. As such, the present disclosure may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files', and all other such terms should be taken to mean digital files and/or data objects, unless otherwise specified.

The embodiments of the disclosure may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the disclosure may be implemented in any conventional computer programming language. For example, preferred embodiments may be implemented in a primarily procedural programming language (e.g., "C" or "Go"), a primarily functional programming language (e.g., "Elixir", "Haskell", or "Scala"), or a primarily object-oriented language (e.g., "C++", "java", "PHP", "PYTHON", or "C#"). Alternative embodiments of the disclosure may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the disclosure may be implemented as a combination of both software (e.g., a computer program product) and hardware. Still other embodiments of the disclosure may be implemented as entirely hardware, or entirely software (e.g., a computer program product).

A person understanding this disclosure may now conceive of alternative structures and embodiments or variations of the above all of which are intended to fall within the scope of the disclosure as defined in the claims that follow.

What is claimed is:

1. A method for evaluating e-commerce application errors comprising:

collecting error information of e-commerce application errors experienced by users of a plurality of different e-commerce applications in associated e-commerce sessions, wherein each of the errors is associated with an issue identifier and a unique error including a portion indicative of an e-commerce application of the plurality of e-commerce applications that generated the respective error, wherein the issue identifier can identify common issues across the different e-commerce applications;

for each of the errors, determining error funnel statistics for users experiencing the respective error, the error funnel statistics providing an indication of a number of users progressing to each next stage in a multi-stage commerce progress funnel of the e-commerce application associated with the respective error;

generating a user interface providing, for a respective e-commerce application of the plurality of different e-commerce application, indications of one or more of the errors associated with the respective e-commerce application and a respective estimated revenue loss resulting from each of the respective errors, the estimated revenue lost determined based on an average purchase amount for the e-commerce application and a difference between error funnel statistics for the error and average funnel progression statistics of users of the e-commerce application, wherein the indications of one or more of the errors provided in the generated user interface are presented in a ranked order based on at least an estimated time to fix the respective error; and transmitting the generated user interface to a remote computer.

2. The method of claim 1, wherein collecting error information comprises:

receiving and storing session information from a plurality of users, the session information of each of the plurality of users associated with the respective user's interaction with the e-commerce application and comprising error indications of one or more application errors resulting from the user's interaction with the e-commerce application, each of the one or more application errors identified by a unique error identifier.

3. The method of claim 2, wherein the session information further comprises:

interaction indications of one or more application interactions of the e-commerce application with at least one server.

4. The method of claim 3, further comprising:

processing session information to determine the average funnel progression statistics and the error funnel progression statistics.

5. The method of claim 1, wherein the indications of one or more of the errors presented in the generated user interface are presented in a ranked order further based on the estimated revenue lost resulting from the respective error.

6. The method of claim 1, wherein the error information is collected from a user's device from a data collection script embedded in the e-commerce application.

7. The method of claim 6, further comprising:

receiving a request for the data collection script from a computing device; and transmitting the requested data collection script to the computing device.

8. The method of claim 1, wherein the error information is further collected from one or more servers associated with the e-commerce application.

9. The method of claim 1, wherein session information includes information for recreating a user's view of the e-commerce session.

10. A non-volatile computer readable memory storing instructions, which when executed by a processor of a system configure the system to perform a method comprising:

collecting error information of e-commerce application errors experienced by users of a plurality of different e-commerce applications in associated e-commerce sessions, wherein each of the errors is associated with an issue identifier and a unique error including a portion indicative of an e-commerce application of the plurality of e-commerce applications that generated the respective error, wherein the issue identifier can identify common issues across the different e-commerce applications;

for each of the errors, determining error funnel statistics for users experiencing the respective error, the error funnel statistics providing an indication of a number of users progressing to each next stage in a multi-stage commerce progress funnel of the e-commerce application associated with the respective error;

generating a user interface providing, for a respective e-commerce application of the plurality of different e-commerce application, indications of one or more of the errors associated with the respective e-commerce application and a respective estimated revenue loss resulting from each of the respective errors, the estimated revenue lost determined based on an average purchase amount for the e-commerce application and a difference between error funnel statistics for the error and average funnel progression statistics of users of the e-commerce application, wherein the indications of one or more of the errors provided in the generated user interface are presented in a ranked order based on at least an estimated time to fix the respective error; and transmitting the generated user interface to a remote computer.

11. The non-volatile computer readable memory of claim 10, wherein collecting error information comprises:

receiving and storing session information from a plurality of users, the session information of each of the plurality of users associated with the respective user's interaction with the e-commerce application and comprising error indications of one or more application errors resulting from the user's interaction with the e-commerce application, each of the one or more application errors identified by a unique error identifier.

12. The non-volatile computer readable memory of claim 11, wherein the session information further comprises:

interaction indications of one or more application interactions of the e-commerce application with at least one server.

13. The non-volatile computer readable memory of claim 12, wherein the method performed by executing the stored instructions further comprises:

processing session information to determine the average funnel progression statistics and the error funnel progression statistics.

14. The non-volatile computer readable memory of claim 10, wherein the indications of one or more of the errors presented in the generated user interface are presented in a ranked order further based on the estimated revenue lost resulting from the respective error.

15. The non-volatile computer readable memory of claim 10, wherein the error information is collected from a user's device from a data collection script embedded in the e-commerce application.

16. The non-volatile computer readable memory of claim 15, wherein the method performed by executing the stored instructions further comprises:

receiving a request for the data collection script from a computing device; and transmitting the requested data collection script to the computing device.

17. The non-volatile computer readable memory of claim 10, wherein the error information is further collected from one or more servers associated with the e-commerce application.

18. The non-volatile computer readable memory of claim 10, wherein session information includes information for recreating a user's view of the session.

19. A system for evaluating application errors, the system comprising:
 a processor for executing instructions; and
 a memory storing instructions, which when executed by the processor configures the system to perform a method comprising:
  collecting error information of e-commerce application errors experienced by users of a plurality of different e-commerce applications in associated e-commerce sessions, wherein each of the errors is associated with an issue identifier and a unique error including a portion indicative of an e-commerce application of the plurality of e-commerce applications that generated the respective error, wherein the issue identifier can identify common issues across the different e-commerce applications;
  for each of the errors, determining error funnel statistics for users experiencing the respective error, the error funnel statistics providing an indication of a number of users progressing to each next stage in a multi-stage commerce progress funnel of the e-commerce application associated with the respective error;
  generating a user interface providing, for a respective e-commerce application of the plurality of different e-commerce application, indications of one or more of the errors associated with the respective e-commerce application and a respective estimated revenue loss resulting from each of the respective errors, the estimated revenue lost determined based on an average purchase amount for the e-commerce application and a difference between error funnel statistics for the error and average funnel progression statistics of users of the e-commerce application, wherein the indications of one or more of the errors provided in the generated user interface are presented in a ranked order based on at least an estimated time to fix the respective error; and
  transmitting the generated user interface to a remote computer.

* * * * *